United States Patent
Ota (10) Patent No.: US 8,441,566 B2
(45) Date of Patent: *May 14, 2013

(54) IMAGE SENSING APPARATUS AND IMAGING SYSTEM

(75) Inventor: Keisuke Ota, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 66 days.

This patent is subject to a terminal disclaimer.

(21) Appl. No.: 13/019,985

(22) Filed: Feb. 2, 2011

(65) Prior Publication Data

US 2011/0122306 A1    May 26, 2011

Related U.S. Application Data (63) Continuation of application No. 12/181,642, filed on Jul. 29, 2008, now Pat. No. 7,903,161.

(30) Foreign Application Priority Data

Aug. 3, 2007   (JP) ................................ 2007-203405

(51) Int. Cl.
    *H04N 5/335*      (2011.01)

(52) U.S. Cl.
    USPC .......................................... 348/308; 348/294

(58) Field of Classification Search .................. 348/294, 348/295, 296, 308; 250/208.1
See application file for complete search history.

(56) References Cited

U.S. PATENT DOCUMENTS

| | | | |
|---|---|---|---|
| 5,262,871 A | 11/1993 | Wilder et al. | 348/307 |
| 5,452,004 A | 9/1995 | Roberts | 348/301 |
| 7,382,407 B2 | 6/2008 | Cho et al. | 348/296 |
| 2007/0109436 A1* | 5/2007 | Mabuchi | 348/308 |
| 2007/0126902 A1 | 6/2007 | Kuroda | 348/296 |

FOREIGN PATENT DOCUMENTS

| | | |
|---|---|---|
| JP | 2000-350103 | 12/2000 |
| JP | 2005-184358 | 7/2005 |
| JP | 2007-158740 | 6/2007 |

\* cited by examiner

*Primary Examiner* — Tuan Ho
(74) *Attorney, Agent, or Firm* — Fitzpatrick, Cella, Harper & Scinto (57) ABSTRACT

An image sensing apparatus comprises: a pixel array in which a plurality of pixels are arrayed in a row direction and column direction; a selection unit configured to select a row of the pixel array; and a readout unit configured to read out signals from the pixels of the row selected by the selection unit, wherein, when the readout unit reads out signals from the pixels of not all rows but some rows in the pixel array, the selection unit resets the pixels of rows in adjacent regions adjacent to readout rows from which signals are read out, and the pixel array includes rows, in which the pixels are not reset by the selection unit, in regions other than the readout rows and the adjacent regions.

6 Claims, 10 Drawing Sheets

FIG. 10

IMAGE SENSING APPARATUS AND IMAGING SYSTEM

This application is a continuation of U.S. application Ser. No. 12/181,642, filed Jul. 29, 2008, the contents of which are incorporated herein by reference.

BACKGROUND OF THE INVENTION

1. Field of the Invention

The present invention relates to an image sensing apparatus and an imaging system.

2. Description of the Related Art

Conventionally, to improve the frame rate at which signals are read out from the pixel array of an image sensing apparatus, sub-sampling readout has often been adopted. In the sub-sampling readout, signals are read out from the pixels of not all rows but some rows in the pixel array. When this image sensing apparatus performs the sub-sampling readout, light enters not only readout rows from which signals are read out but also non-readout rows from which no signals are read out. There are cases where the pixels of the non-readout rows adjacent to the readout rows often photoelectrically convert electric charges in an amount that exceeds the saturated charge amount upon light reception so that these electric charges overflow into the readout rows. In this case, problems such as smear and blooming in which false signals mix into signals read out from the pixel array are posed, which may degrade the quality of the obtained image.

To solve this problem, Japanese Patent Laid-Open No. 2000-350103 discloses a technique of resetting the pixels of the non-readout rows in at least part of the period during which the pixels of the readout rows accumulate electric charges. This makes it possible to suppress electric charges in an amount that exceeds the saturated charge amount from overflowing from the pixels of the non-readout rows into those of the readout rows, thus suppressing degradation in the quality of the obtained image.

The technique disclosed in Japanese Patent Laid-Open No. 2000-350103 resets the pixels of all non-readout rows. With this operation, an unnecessarily large current flows in the image sensing apparatus. This may increase power consumption more than necessary upon reading out signals from the pixel array of the image sensing apparatus.

SUMMARY OF THE INVENTION

The present invention provides an image sensing apparatus and imaging system which can suppress power consumption upon reading out signals from a pixel array even when degradation in the quality of the obtained image is suppressed.

According to the first aspect of the present invention, there is provided an image sensing apparatus comprising: a pixel array in which a plurality of pixels are arrayed in a row direction and column direction; a selection unit configured to select a row of the pixel array; and a readout unit configured to read out signals from the pixels of the row selected by the selection unit, wherein, when the readout unit reads out signals from the pixels of not all rows but some rows in the pixel array, the selection unit resets the pixels of rows in adjacent regions adjacent to readout rows from which signals are read out, and the pixel array includes rows, in which the pixels are not reset by the selection unit, in regions other than the readout rows and the adjacent regions.

According to the second aspect of the present invention, there is provided an imaging system comprising: an image sensing apparatus defined in claim 1; an optical system configured to form an image on an image sensing surface of the image sensing apparatus; and a signal processing unit configured to process the signal output from the image sensing apparatus to generate image data.

According to the present invention, it is possible to suppress power consumption upon reading out signals from the pixel array of an image sensing apparatus even when degradation in the quality of the obtained image is suppressed.

Further features of the present invention will become apparent from the following description of exemplary embodiments with reference to the attached drawings.

DESCRIPTION OF THE EMBODIMENTS

Figure 1:
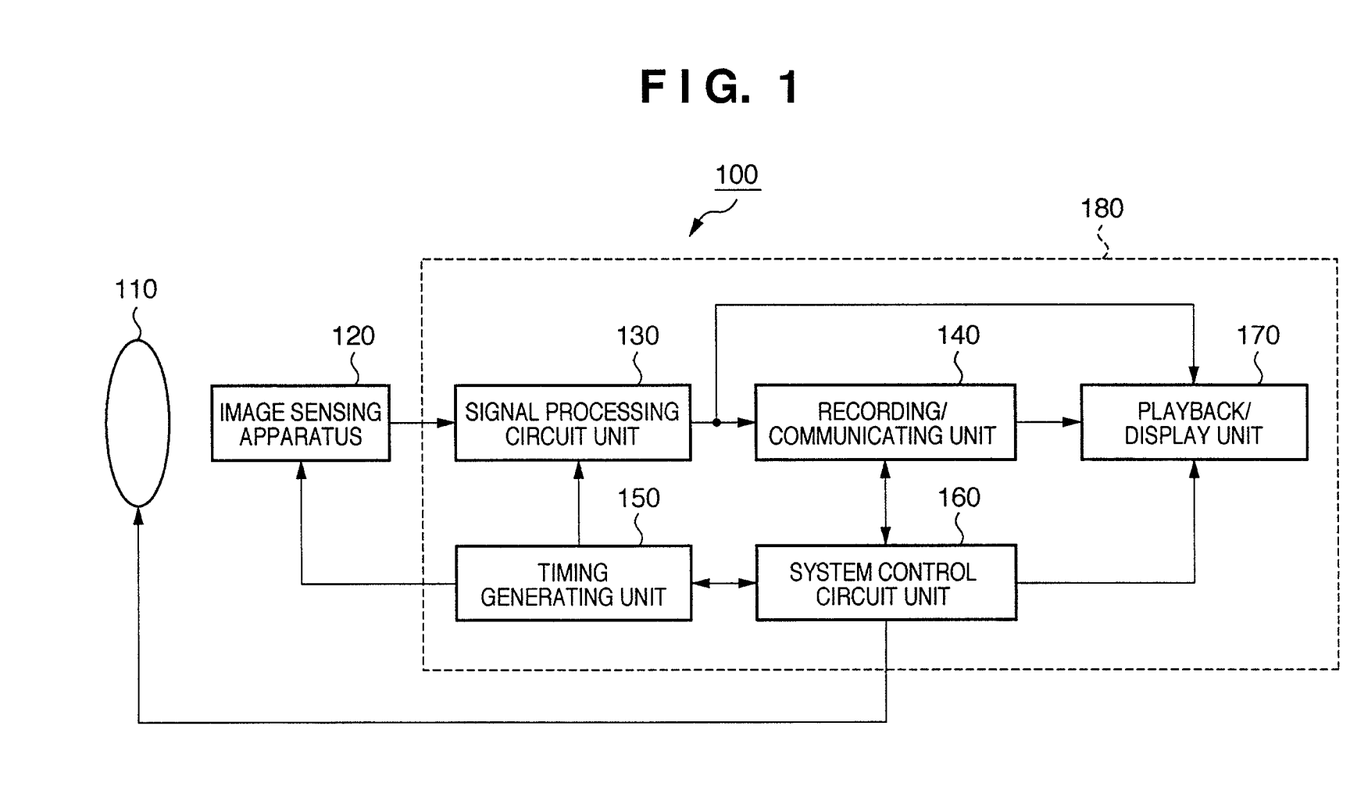
FIG. 1 is a block diagram showing the configuration of an imaging system 100 according to the first embodiment of the present invention.

The schematic configuration and schematic operation of an imaging system 100 according to the first embodiment of the present invention will be explained with reference to FIG. 1. FIG. 1 is a block diagram showing the configuration of the imaging system 100 according to the first embodiment of the present invention.

The imaging system 100 comprises an optical system 110, image sensing apparatus 120, and signal processing unit 180. The signal processing unit 180 includes a signal processing circuit unit 130, recording/communicating unit 140, timing controlling circuit unit 150, system control circuit unit 160, and playback/display unit 170.

The optical system 110 forms an object image on the image sensing surface (pixel array) of the image sensing apparatus 120.

The image sensing apparatus 120 comprises a pixel array in which a plurality of pixels are arrayed in the row direction and column direction. The image sensing apparatus 120 converts an object image formed on the pixel array into an image signal. The image sensing apparatus 120 reads out the image signal from the pixel array, and outputs it to the signal processing circuit unit 130.

The signal processing circuit unit 130 processes the image signal supplied from the image sensing apparatus 120, in accordance with a predetermined method (e.g. program). The signal processing circuit unit 130, for example, A/D-converts an image signal (analog signal) to generate image data (digital signal). The signal processing circuit unit 130, for example, compresses the image data. The signal processing circuit unit 130 supplies the image data that has undergone the signal processing to the recording/communicating unit 140 and playback/display unit 170.

The recording/communicating unit 140 records the image data, which is supplied from the signal processing circuit unit 130, on a recording medium (not shown) or transmits it to an external device (not shown). Alternatively, the recording/communicating unit 140 reads out the image data from the recording medium (not shown), and supplies it to the playback/display unit 170 or supplies it to the system control circuit unit 160 upon receiving a predetermined instruction from an input unit (not shown).

The playback/display unit 170 displays the image data, which is supplied from the signal processing circuit unit 130 or recording/communicating unit 140, on a display device.

The timing controlling circuit unit 150 generates a first control signal for controlling the driving timing of the image sensing apparatus 120, and supplies it to the image sensing apparatus 120. The timing controlling circuit unit 150 also generates a second control signal for controlling the driving timing of the signal processing circuit unit 130, and supplies it to the signal processing circuit unit 130.

An example of the first control signal supplied to the image sensing apparatus 120 is a signal for controlling the image sensing apparatus 120 in an all-pixel readout mode. In this case, the image sensing apparatus 120 reads out signals from the pixels of all rows in the pixel array. The all-pixel readout mode is selected by the system control circuit unit 160 when sensing, for example, a still image.

Another example of the first control signal supplied to the image sensing apparatus 120 is a signal for controlling the image sensing apparatus 120 in a sub-sampling readout mode. In this case, the image sensing apparatus 120 reads out signals from the pixels of not all rows but some rows in the pixel array. The sub-sampling readout mode is selected by the system control circuit unit 160 when sensing, for example, a moving image.

The system control circuit unit 160 receives information in response to a predetermined instruction from the recording/communicating unit 140. The system control circuit unit 160 controls the optical system 110, recording/communicating unit 140, playback/display unit 170, and timing controlling circuit unit 150 in accordance with the predetermined instruction. The system control circuit unit 160 controls the optical system 110, recording/communicating unit 140, playback/display unit 170, and timing controlling circuit unit 150 in the all-pixel readout mode in accordance with, for example, a still image sensing instruction. Alternatively, the system control circuit unit 160 controls the optical system 110, recording/communicating unit 140, playback/display unit 170, and timing controlling circuit unit 150 in the sub-sampling readout mode in accordance with, for example, a moving image sensing instruction.

Figure 2:
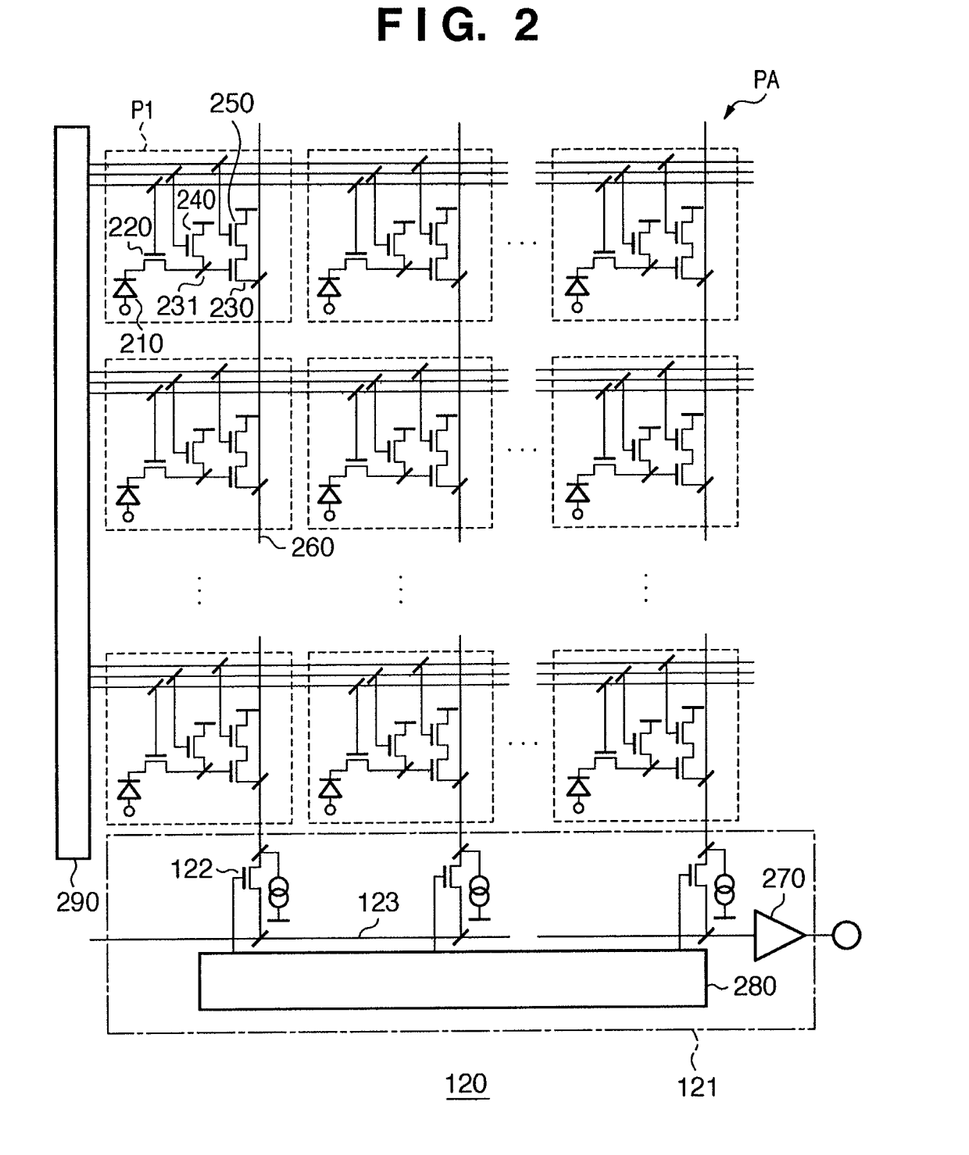
FIG. 2 is a circuit diagram showing the arrangement of an image sensing apparatus 120.

The arrangement and operation of the image sensing apparatus 120 will be explained with reference to FIG. 2. FIG. 2 is a circuit diagram showing the arrangement of the image sensing apparatus 120.

The image sensing apparatus 120 comprises a pixel array PA, selection unit 290, and readout unit 121.

In the pixel array PA, a plurality of pixels P1, . . . are arrayed in the row direction and column direction. The pixel P1 includes a photoelectric conversion element 210, transfer switch 220, pixel amplifier 230, a floating diffusion (to be abbreviated as an FD hereinafter) 231, reset switch 240, and vertical selection switch 250.

The photoelectric conversion element 210 photoelectrically converts the incident light to generate a signal (i.e. electric charges). An example of the photoelectric conversion element 210 is a photodiode.

The transfer switch 220 transfers the signal accumulated by the photoelectric conversion element 210 to the FD 231 upon being turned on. An example of the transfer switch 220 is a transfer MOS transistor, which is turned on when its gate is supplied with an active transfer signal from the selection unit 290. The FD 231 converts the transferred electric charge (signal) into a voltage (signal).

The pixel amplifier 230 receives the voltage (signal) from the FD 231. When the pixel P1 is selected by turning on the vertical selection switch 250, the pixel amplifier 230 amplifies the received signal, and outputs it to a column signal line 260. An example of the pixel amplifier 230 is an amplification MOS transistor, which receives the voltage (signal) from the FD 231 at its gate. The column signal line 260 is connected to the pixels of each column in the pixel array PA.

The vertical selection switch 250 receives a control signal for selecting the pixel P1, and controls the pixel amplifier 230 to perform an amplification operation, in accordance with the control signal. An example of the vertical selection switch 250 is a selection MOS transistor, which is turned on when its gate is supplied with an active selection signal from the selection unit 290, and supplies a power supply voltage to the drain of the amplification MOS transistor.

The reset switch 240 resets the photoelectric conversion element 210 and FD 231 upon being turned on when the transfer switch 220 is ON. That is, the reset switch 240 resets the pixel P1 upon being turned on when the transfer switch 220 is ON. An example of the reset switch 240 is a reset MOS transistor, which is turned on when its gate is supplied with an active reset signal from the selection unit 290.

The selection unit 290 selects a row in the pixel array PA. An example of the selection unit 290 is a vertical scanning circuit, which sequentially scans rows in the pixel array PA.

The readout unit 121 reads out signals from the row selected by the selection unit 290, via the column signal lines 260 of respective columns. The readout unit 121 includes switches 122 of respective columns, a horizontal scanning circuit 280, a horizontal output line 123, and an output amplifier 270. The switches 122 of respective columns are interposed between the horizontal output line 123 and the column signal lines 260 of corresponding columns. The horizontal scanning circuit 280 sequentially scans (turns on) the switches 122 of respective columns, and sequentially supplies signals from the pixels of respective columns in the row, which is selected by the selection unit 290, to the output amplifier 270 via the horizontal output line 123. The output amplifier 270 amplifies the supplied signals to generate an image signal, and outputs it to the signal processing circuit unit 130 (see FIG. 1).

When receiving a signal for controlling the image sensing apparatus 120 in the all-pixel readout mode from the timing controlling circuit unit 150 (see FIG. 1), the selection unit 290 sequentially selects all rows in the pixel array PA. That is, the selection unit 290 sequentially supplies an active selection signal to the pixels of all rows. The selection unit 290 then sequentially supplies an active transfer signal to the pixels of all rows. With this operation, the readout unit 121 reads out signals from all rows in the pixel array PA.

When receiving a signal for controlling the image sensing apparatus 120 in the sub-sampling readout mode from the timing controlling circuit unit 150 (see FIG. 1), the selection unit 290 sequentially selects not all rows but some rows in the pixel array PA as readout rows. That is, the selection unit 290 sequentially supplies an active selection signal to the pixels of readout rows. The readout rows are rows from which signals are read out. The selection unit 290 then sequentially supplies an active transfer signal to the pixels of the readout rows. With this operation, the readout unit 121 reads out signals from not all rows but some rows (readout rows) in the pixel array PA.

Figure 3:
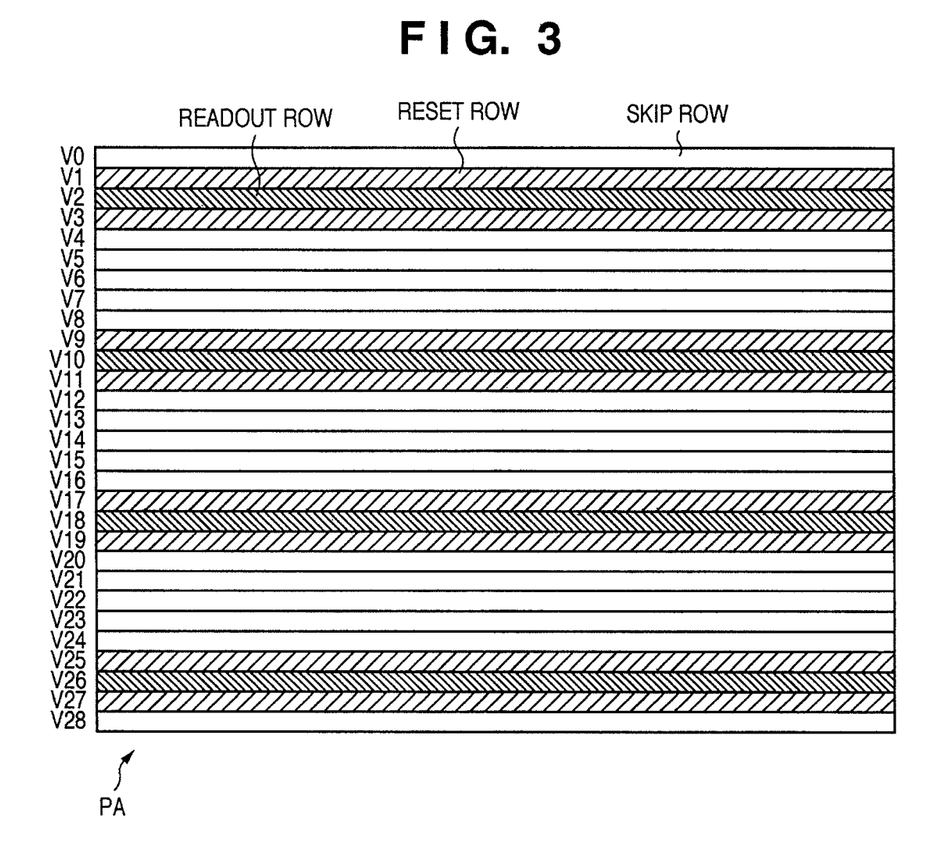
FIG. 3 is a view for explaining an example of the operation of the image sensing apparatus 120 in a sub-sampling readout mode.

The operation of the image sensing apparatus 120 in the sub-sampling readout mode will be explained with reference to FIG. 3. FIG. 3 is a view for explaining an example of the operation of the image sensing apparatus 120 in the sub-sampling readout mode.

As shown in FIG. 3, the selection unit 290 selects, for example, some rows V2, V10, V18, and V26 in the pixel array PA as readout rows in the sub-sampling readout mode. The readout rows are rows from which signals are read out. The readout rows V2, V10, V18, and V26 are arranged with a spacing corresponding to three or more rows, that is seven rows between them in the pixel array PA in this case.

The selection unit 290 resets the pixels of a plurality of adjacent regions (reset rows V1, V3, V9, V11, V17, V19, V25, and V27) adjacent to the readout rows V2, V10, V18, and V26 in the sub-sampling readout mode. The reset rows are rows in which the pixels are reset without reading out signals. Each adjacent region includes one reset row.

The selection unit 290 does not reset the pixels of skip rows (rows V0, V4 to V8, V12 to V16, V20 to V24, and V28) other than the readout rows and adjacent regions of the pixel array PA. The skip rows are rows which are scanned by the selection unit 290 without reading out signals and resetting the pixels (in which the scanning address of the selection unit 290 is merely advanced). That is, the pixel array PA includes rows, in which the pixels are not reset by the selection unit 290 (rows V0, V4 to V8, V12 to V16, V20 to V24, and V28), in regions other than the readout rows and adjacent regions.

In this manner, since the pixels of the adjacent regions (reset rows) adjacent to the readout rows are reset, electric charges in an amount that exceeds the saturated charge amount can be suppressed from overflowing from the pixels of the adjacent regions (reset rows) into those of the readout rows. This makes it possible to suppress the occurrence of smear and blooming, thus suppressing degradation in the quality of the obtained image.

Most of signals which mix into the pixels of each readout row are signals which have overflowed from the pixels of rows immediately adjacent to the readout row. When each adjacent region is set to include one row, electric charges in an amount that exceeds the saturated charge amount can be sufficiently suppressed from overflowing from the pixels of the adjacent regions (reset rows) into those of the readout rows.

Each adjacent region may include two rows. That is, most of signals which mix into the pixels of each readout row are signals which have overflowed from the pixels of rows first and second adjacent to the readout row. For example, as for signals from the pixels of the readout row V10 shown in FIG. 3, signals from two pixels before and after the readout row V10, that is, four pixels indicated by V8, V9, V11, and V12 dominantly mix. This is because signals which have overflowed from the pixels of a certain row mix into signals from the pixels of rows before and after the certain row at a predetermined ratio. The signals mixed into the signals from the pixels of rows adjacent to the above-described certain row also mix into signals from the pixels of next adjacent rows at a predetermined ratio. For this reason, the influence on the pixels of a row of interest exerted by signals which have overflowed from the pixels of rows spaced apart from the pixels of the row of interest by three or more rows is limited. When each adjacent region is set to include two rows, electric charges in an amount that exceeds the saturated charge amount can be sufficiently suppressed from overflowing from the pixels of the adjacent regions (reset rows) into those of the readout rows. In this case, the readout rows are arranged with a spacing corresponding to five or more rows between them in the pixel array PA.

Since the pixels of skip rows other than the readout rows and adjacent regions of the pixel array are not reset, an unnecessarily large current can be suppressed from averagely flowing in the image sensing apparatus. This makes it possible to suppress an increase in power consumption more than necessary upon reading out signals from the pixel array of the image sensing apparatus.

Figure 4:
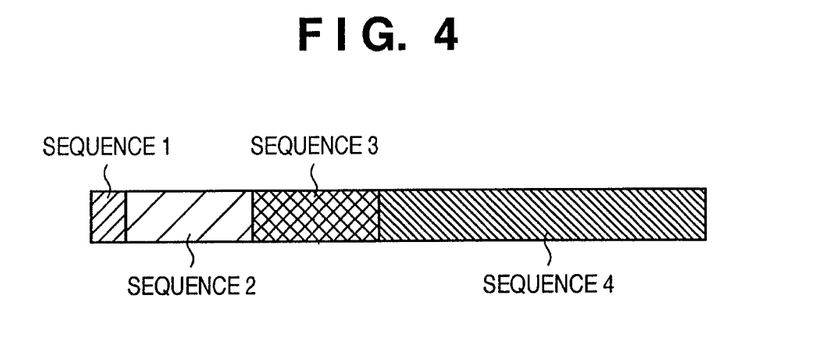
FIG. 4 is a chart showing the sequences of the operation of the image sensing apparatus 120 in a 1-line period.

The sequences of the operation of the image sensing apparatus 120 in a 1-line period from when a readout row in the pixel array PA starts being scanned until the next row is scanned will be described with reference to FIG. 4. FIG. 4 is a chart showing the sequences of the operation of the image sensing apparatus 120 in the 1-line period.

In sequence 1, the selection unit 290 supplies an active selection signal to the vertical selection switch 250 in each pixel of a readout row. With this operation, the vertical selection switch 250 in the pixel of the readout row is turned on, and the pixel of the readout row starts being selected.

In sequence 2, the pixel amplifier 230 in the pixel of the readout row amplifies a noise signal corresponding to a noise component accumulated in the FD 231 after having been reset by the reset switch 240, and outputs it to the column signal line 260. The noise signal transmitted by the column signal line 260 is held in a memory (not shown) of the readout unit 121.

In sequence 3, the selection unit 290 supplies an active transfer signal to the transfer switch 220 in the pixel of the readout row. With this operation, the transfer switch 220 is turned on, and a signal accumulated by the photoelectric conversion element 210 is transferred to the FD 231. The pixel amplifier 230 in the pixel of the readout row amplifies the optical signal transferred to the FD 231, and outputs it to the column signal line 260. The optical signal transmitted by the column signal line 260 is held in a memory (not shown) of the readout unit 121. The optical signal contains the noise signal read out in sequence 2, in addition to the signal accumulated by the photoelectric conversion element 210.

In sequence 4, the horizontal scanning circuit 280 sequentially scans (turns on) the switches 122 of respective columns, and sequentially supplies the noise signals and optical signals from the pixels of respective columns in the row, which is selected by the selection unit 290, to the output amplifier 270 via the horizontal output line 123. The output amplifier 270 amplifies the differences between the supplied noise signals and optical signals to generate an image signal, and outputs it to the signal processing circuit unit 130 (see FIG. 1). Also in sequence 4, the FD 231 and photoelectric conversion element 210 are reset.

In this manner, an operation for reading out signals from a readout row requires a large number of sequences to be performed, thus taking a long time. This operation generally takes about several tens of microseconds.

Figure 5:
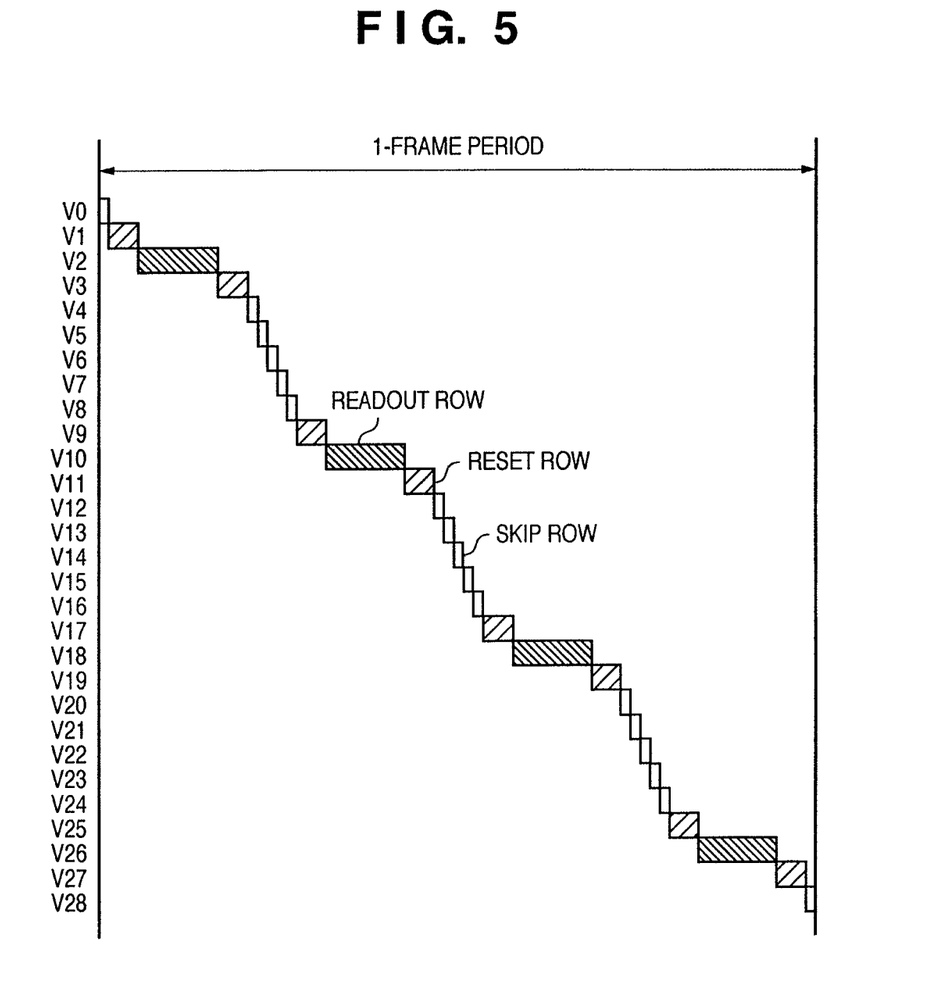
FIG. 5 is a chart showing the operation of the image sensing apparatus 120 in a 1-frame period.

The operation of the image sensing apparatus 120 in a 1-frame period will be explained with reference to FIG. 5. FIG. 5 is a chart showing the operation of the image sensing apparatus 120 in the 1-frame period. Referring to FIG. 5, the abscissa indicates the timing, and the ordinate indicates the vertical position in the pixel array.

As shown in FIG. 5, the selection unit 290 sequentially scans, for example, the rows V0 to V28 in the pixel array PA.

Note that the above-described operation is performed in the readout rows at this time. The time to scan the readout rows is longer than those to scan the reset rows and skip rows.

In each of the pixels of the skip rows, none of the transfer switch 220, reset switch 240, and vertical selection switch 250 need to be turned on. A minimum pulse time to advance the address of the selection unit 290 suffices as the time to scan the skip rows.

In each of the pixels of the reset rows, the vertical selection switch 250 need not be turned on, but both the transfer switch 220 and reset switch 240 need be turned on. The time to scan the reset rows is longer than that to scan the skip rows, and is shorter than that to scan the readout rows.

When the selection unit 290 sequentially scans the rows in the pixel array PA, if the pixels of all rows other than the readout rows are sequentially reset, the 1-frame period becomes relatively long. This decreases the frame rate, which may make it impossible to attain a frame rate required to sense, for example, a moving image.

In contrast, this embodiment sequentially resets the pixels of some rows (adjacent regions and reset rows) other than the readout rows, and does not reset the remaining skip rows, thus minimizing the 1-frame period. This makes it possible to improve the frame rate, thus attaining a frame rate required to sense, for example, a moving image.

If the selection unit 290 resets the pixels of all rows other than the readout rows at once, a large current instantaneously flows in the pixel array PA. In this case, the power supply potential of the power supply line fluctuates to deteriorate optical signals, so noise or shading may occur in the obtained image. This results in degradation in the quality of the obtained image.

In contrast, since this embodiment resets the reset rows not at once but sequentially, no large current flows instantaneously. Still better, since this embodiment resets not all rows other than the readout rows but some reset rows, no unnecessarily large current flows.

Figure 6:
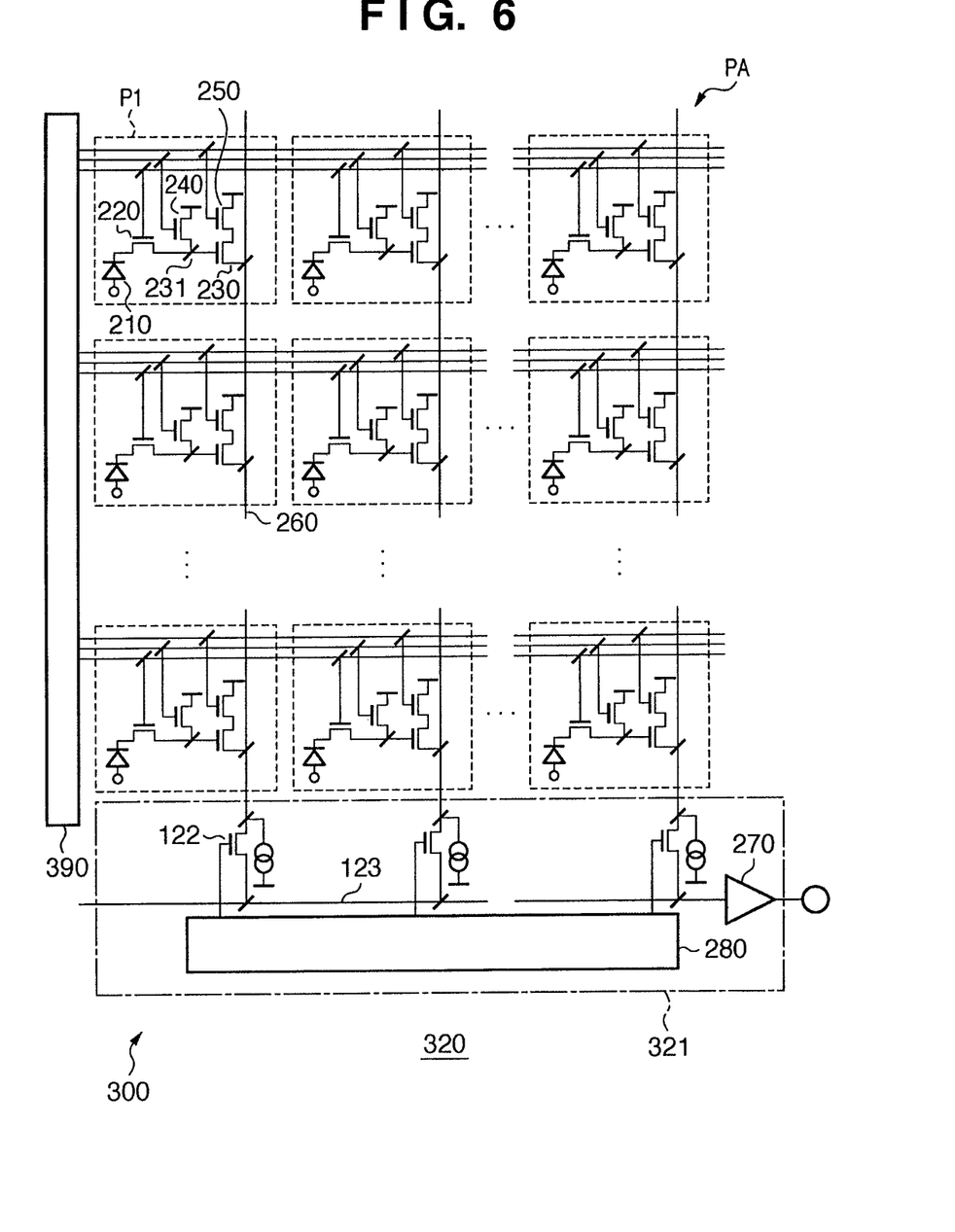
FIG. 6 is a circuit diagram showing the arrangement of an image sensing apparatus 320 in an imaging system 300 according to the second embodiment of the present invention.

An imaging system 300 according to the second embodiment of the present invention will be explained next with reference to FIG. 6. FIG. 6 is a circuit diagram showing the arrangement of an image sensing apparatus 320 in the imaging system 300 according to the second embodiment of the present invention. Parts different from those in the first embodiment will be described mainly, and a description of the same parts will not be given.

Figure 7:
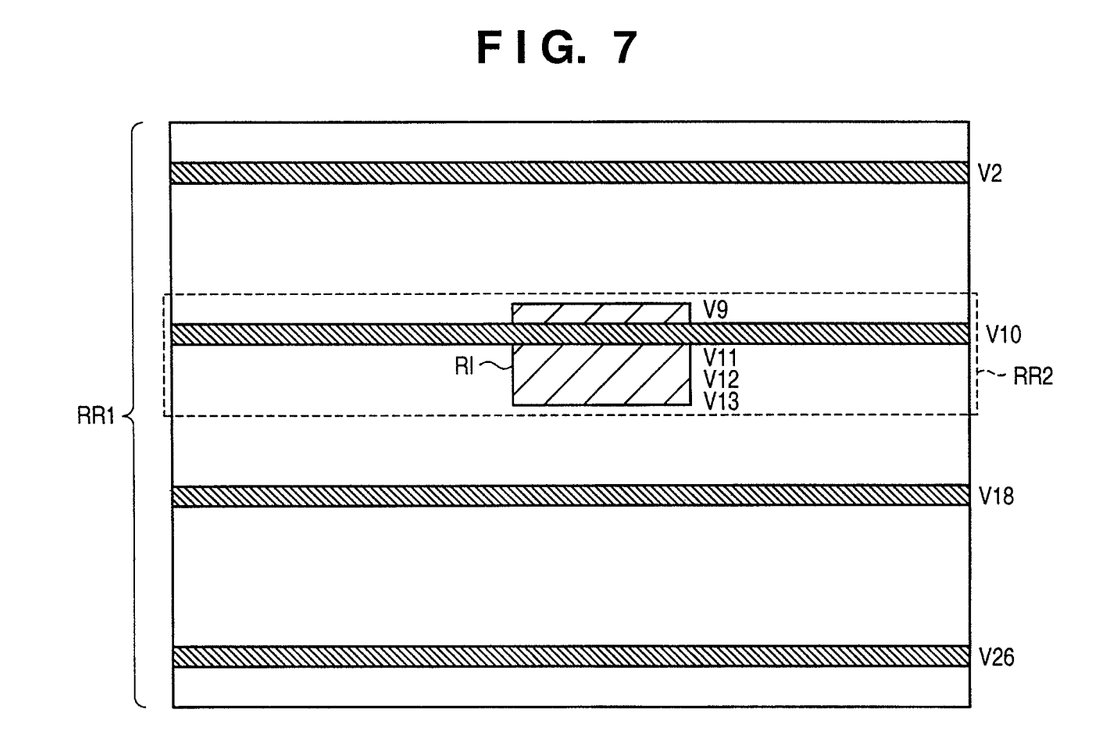
FIG. 7 is a view showing a pixel region of interest and readout regions from which signals are read out.
Figure 8:
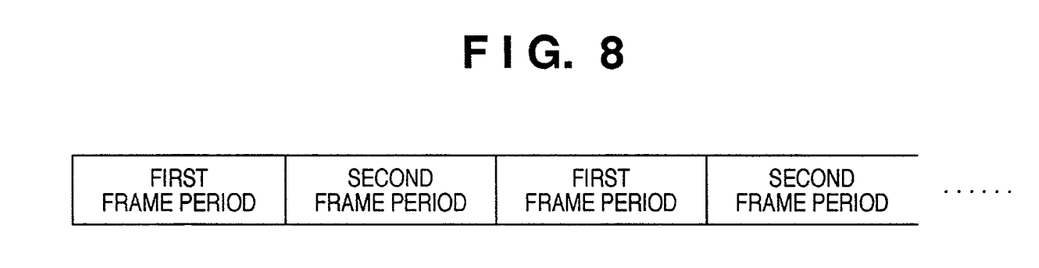
FIG. 8 is a view showing the order between the first frame periods and the second frame periods.
Figure 9:
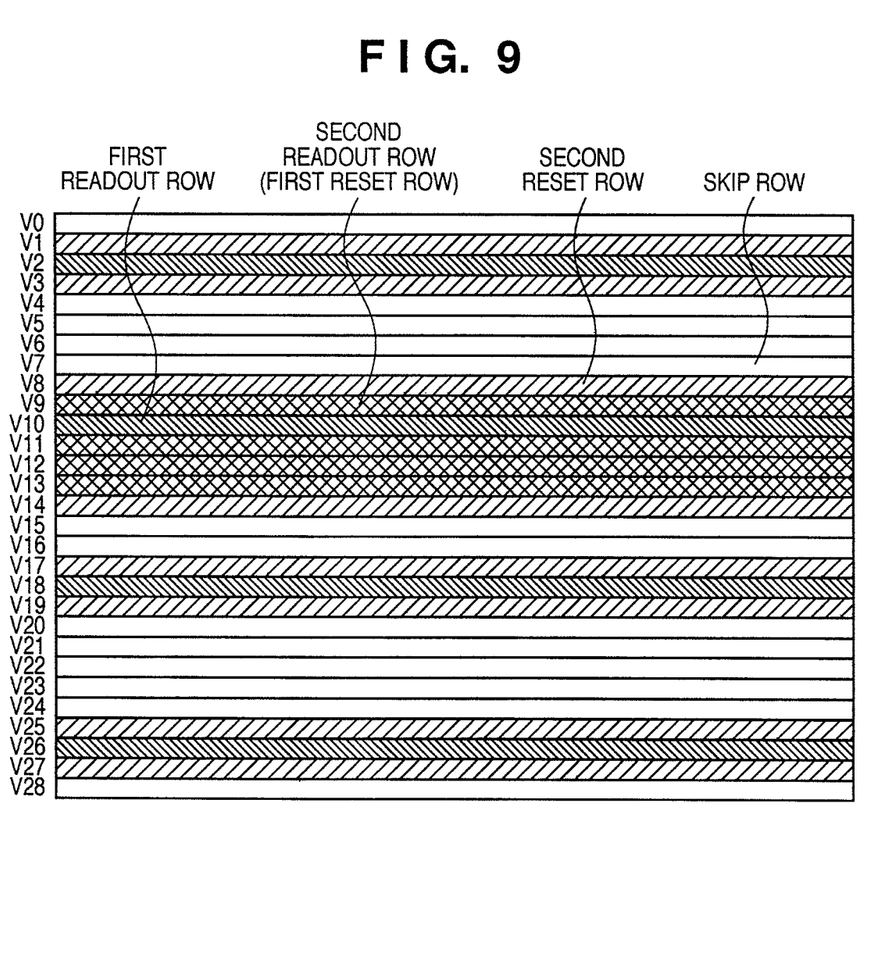
FIG. 9 is a view for explaining an example of the operation of the image sensing apparatus 320 in the sub-sampling readout mode.
Figure 10:
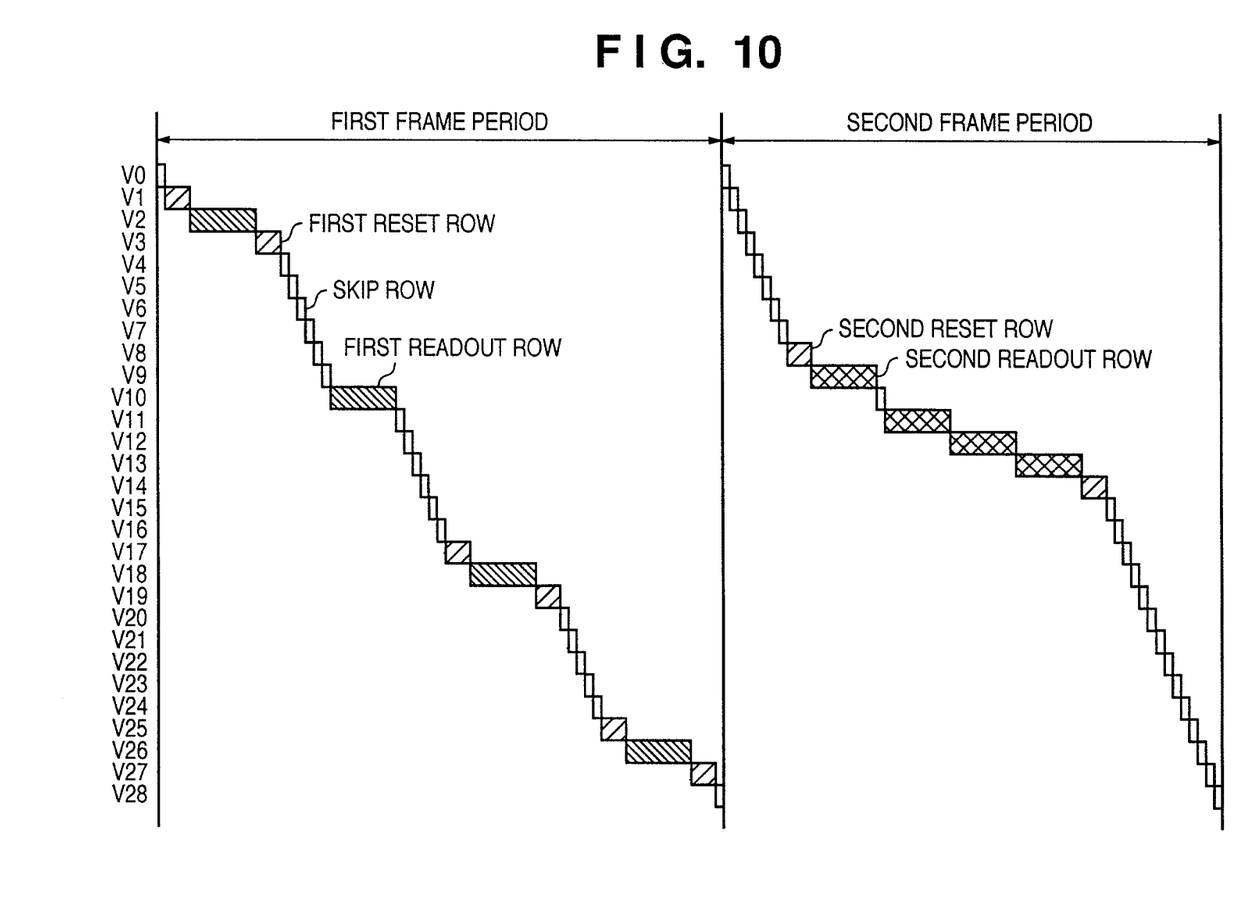
FIG. 10 is a chart showing the operation of the image sensing apparatus 320 in a 1-frame period.

The imaging system 300 is different from the imaging system 100 in the first embodiment in that it comprises the image sensing apparatus 320. The image sensing apparatus 320 comprises a selection unit 390 and readout unit 321. As shown in FIGS. 7 to 10, the signal readout operation of the image sensing apparatus 320 is different from that of the image sensing apparatus 120 in the first embodiment in the following points. FIG. 7 is a view showing a pixel region of interest and readout regions from which signals are read out. FIG. 8 is a view showing the order between the first frame periods and the second frame periods. FIG. 9 is a view for explaining an example of the operation of the image sensing apparatus 320 in the sub-sampling readout mode. FIG. 10 is a chart showing the operation of the image sensing apparatus 320 in a 1-frame period.

As shown in FIGS. 9 and 10, the selection unit 390 sequentially selects, for example, first readout rows V2, V10, V18, and V26 from a first readout region RR1 (see FIG. 7) as the entire pixel array PA in the first frame period. With this operation, the readout unit 321 reads out signals from the entire pixel array PA with a first pixel density in the first frame period. The first pixel density is defined as a value obtained by dividing the number of first readout rows by the number of rows in the first readout region RR1. In the example shown in FIGS. 9 and 10, the first pixel density is 4 (rows)÷29 (rows) ≈0.14.

Also, as shown in FIGS. 9 and 10, the selection unit 390 selects, for example, second readout rows V9 and V11 to V13 from a second readout region RR2 (see FIG. 7) as a part of the pixel array PA in the second frame period. The second readout region RR2 includes a pixel region of interest RI. With this operation, the readout unit 321 reads out signals from the second readout region RR2 as a part of the pixel array PA with a second pixel density higher than the first pixel density in the second frame period. The second pixel density is defined as a value obtained by dividing the number of second readout rows by the number of rows in the second readout region RR2. In the example shown in FIGS. 9 and 10, the second pixel density is 4 (rows)÷5 (rows)=0.8. That is, in the second frame period, the readout unit 321 reads out signals from the pixels of the rows V9 and V11 to V13 obtained by excluding the readout rows V2, V10, V18, and V26 corresponding to the first frame period from the rows V9 to V13 which overlap the pixel region of interest.

As shown in FIG. 8, the first frame periods and second frame periods are alternately repeated. Accordingly, signals are alternately read out from the pixels of the first readout rows and second readout rows for every other frame period. This makes it possible to monitor a portion of interest with high resolution and exposure similar to that for the entire image corresponding to the entire pixel array in accordance with a partial image corresponding to a part (a pixel region of interest) of the pixel array, while monitoring a wide area with low resolution in accordance with the entire image. This obviates the need for the mechanical operations of the pan/tilt and zoom functions as in the current monitoring cameras. This, in turn, obviates the need for monitoring by a large number of monitoring cameras.

The pixel reset operation of the image sensing apparatus 320 is different from that of the image sensing apparatus 120 in the first embodiment in the following points.

As shown in FIGS. 9 and 10, the selection unit 390 resets the pixels of, for example, first adjacent regions (first reset rows V1, V3, V17, V19, V25, and V27) in the first frame period. The first adjacent regions are rows which are adjacent to the readout rows corresponding to the first frame period (first readout rows V2, V10, V18, and V26), and do not overlap the pixel region of interest RI. If rows which overlap the pixel region of interest RI (rows V9 and V11 in this case) are also reset, an image obtained based on pixel signals read out in the second frame period lacks information on three continuous rows. To avoid this situation, this embodiment resets only rows which are adjacent to the rows corresponding to the first frame period and do not overlap the pixel region of interest RI.

It is therefore possible to prevent only some of the pixels of the second readout rows from being reset in the first frame period so that the pixels of the second readout rows have different accumulation times. It is also possible to suppress electric charges in an amount that exceeds the saturated charge amount from overflowing from the pixels of the first adjacent regions (first reset rows) into those of the first readout rows.

Also, as shown in FIGS. 9 and 10, the selection unit 390 resets the pixels of, for example, second adjacent regions (second reset rows V8 and V14). The second adjacent regions are rows which are adjacent to the pixel region of interest RI and do not overlap the readout rows corresponding to the first frame period (first readout rows V2, V10, V18, and V26).

It is therefore possible to prevent only some of the pixels of the first readout rows from being reset in the second frame period and thereby to prevent the pixels of the first readout rows from having different accumulation times. It is also possible to suppress electric charges in an amount that exceeds the saturated charge amount from overflowing from the pixels of the second adjacent regions (second reset rows) into those of the second readout rows.

As has been described above, it is possible to suppress the occurrence of smear and blooming not only in an image corresponding to the entire pixel array but also in a partial image corresponding to a part (a pixel region of interest) of the pixel array. This makes it possible to suppress degradation in the quality of the obtained image.

Although this embodiment has exemplified a case in which there is only one pixel region of interest, the present invention is also applicable to a case in which there is a plurality of pixel regions of interest.

Also, although FIGS. 2 and 6 exemplify concrete pixel arrangements, the pixel arrangements are not particularly limited to them.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-203405, filed Aug. 3, 2007, which is hereby incorporated by reference herein in its entirety.

What is claimed is:

1. A method of operating an image sensing apparatus comprising a plurality of pixels arranged to form a plurality of rows, wherein the method comprises:

performing a readout operation in a first frame period, wherein the readout operation is performed for plural readout rows, wherein for each readout row the readout operation includes resetting pixels of a first row of rows adjacent to the readout row, then reading out signals from pixels of the readout row, then resetting pixels of a second row of the rows adjacent to the readout row, wherein the readout operation in the first frame period further includes skipping a row in the plurality of rows, other than the readout rows and the rows adjacent to the readout rows.

2. The method according to claim 1, wherein the rows that are skipped undergo neither of read out and reset.

3. The method according to claim 1, further comprising reading out, in a second frame period, signals from the pixels of the row which is skipped in the first frame period.

4. The method according to claim 3, wherein each row of the readout rows in the second frame period is adjacent to one of the readout rows in the first frame period.

5. The method according to claim 1, wherein the rows skipped in the first frame period include two continuous rows.

6. The method according to claim 1, wherein the readout rows in the first frame period are spaced from each other by not less than five rows.

* * * * *